Patented Nov. 20, 1951

2,576,078

UNITED STATES PATENT OFFICE 2,576,078

METHOD FOR THE PREPARATION OF 2-(2-CYCLOALKENYL) CYCLOALKANOLS

Earl L. Pelton, Midland, Mich., assignor to The Dow Chemical Company, Midland, Mich., a corporation of Delaware No Drawing. Application January 3, 1949, Serial No. 69,035

3 Claims. (Cl. 260—631)

1

This invention relates to a method for the production of 2-(2-cycloalkenyl) cycloalkanols.

It is known that, in the conversion of cycloalkanols to aliphatic carboxylic acids by oxidation of the alcohols in fused and substantially anhydrous alkali metal hydroxides, there are obtained as by-products certain cycloalkene and cycloalkane aliphatic acids. The existence of such acids in the mixed reaction product may be explained by the formation of a cycloalkene cycloalkanol as an intermediate.

It is an object of this invention to provide a method for the preparation of 2-(2-cycloalkenyl) cycloalkanols, from which cycloalkane and cycloalkene aliphatic acids may be obtained by alkaline oxidation as principal instead of secondary products. A particular object is to provide a method for the preparation of 2-(2-cyclohexenyl) cyclohexanol, from which 2-cyclohexene-1-caproic acid, cyclohexanebutyric acid, cyclohexane acetic acid and similar compounds may be produced.

The foregoing objects are realized, and 2-(2-cycloalkenyl) cycloalkanols are formed as principal products, by heating together under reflux at about 160°–190° C. an approximately equimolar mixture of a cycloalkanol and a cycloalkanone, in contact with fused aqueous potassium hydroxide or other alkali metal hydroxide of at least 55 per cent concentration and having a boiling point in or above the desired range of reaction temperatures. When reaction is essentially complete, the mixture is cooled to allow the aqueous alkali metal hydroxide to separate from the oily product. The latter is distilled at reduced pressure and found to be an unsaturated alcohol, conforming to the general designation of a 2-(2-cycloalkenyl) cycloalkanol. When this product is caused to react with fused and substantially anhydrous alkali metal hydroxide at 275° to 400° C., its unsaturation may be reduced, especially at the higher temperatures, and the cycloalkanol ring is oxidized in known manner, to form cycloalkane or cycloalkene alkanoic acids as principal products.

In a specific example, 300 grams (3 moles) of cyclohexanol was added, with stirring, to 180 grams of 90 per cent potassium hydroxide and held at a temperature of 170° C. There was then added 300 grams (3.07 moles) of cyclohexanone. The resulting mixture was heated under reflux at 170° C. for 2.5 hours, and was then cooled to room temperature, forming two layers, the lower of which solidified as potassium hydroxide and the upper layer was a light orange colored

2 oil, of which 234 grams (1.35 moles) was distilled in the range from 135° to 145° C. at 20 mm. absolute pressure, after freeing the oily layer from alkali and water. The product had a density at 26° C. of 0.985 and was shown to be an alcohol by its reaction to form a phenylurethane melting at 116° to 118° C. The product was unsaturated, and is proven by its oxidation reactions to be 2-(2-cyclohexenyl) cyclohexanol. When 200 grams of the latter was fused with 1000 grams of potassium hydroxide at 360° C., in the manner described in my prior U. S. Patent 1,961,623, there was obtained, as the principal product, cyclohexanebutyric acid, with lesser amounts of caproic acid and of 2-cyclohexene-1-caproic acid. Fusion, in like manner, of 2-(2-cyclohexenyl) cyclohexanol with an alkali metal hydroxide at 275° to 320° C. gives the 2-cyclohexene-1-caproic acid, $C_{12}H_{20}O_2$, as the principal product.

In a similar manner, 2-(2-cyclopentenyl) cyclopentanol is produced by heating approximately equimolar quantities of cyclopentanol and cyclopentanone under reflux with fused aqueous caustic alkali of over 55 per cent concentration at a temperature between 160° and 190° C.

Other cycloalkene cycloalkanols which may be prepared in similar manner are 2-(2-cyclohexenyl) cyclopentanol, 2-(2-cyclopentenyl) cyclohexanol, 2-(2-camphenyl) cyclohexanol, 2-(2-fenchenyl) cyclopentanol, and the like.

The reaction between the cycloalkanol and the cycloalkanone proceeds equally well in the presence of potassium hydroxide, as described, or of sodium hydroxide or of mixtures of these or other alkali metal hydroxides of at least 55 per cent concentration and with boiling points in or above the desired range of reaction temperatures (160° to 190° C.). The duration of the reaction need only be of sufficient length so that condensation, with liberation of water, between the reagents, is essentially complete. The cycloalkanol may have alkyl substituents present in any available position, and will form cycloalkyl alkyl-cycloalkanols as condensates which, when oxidized with fused caustic alkalies, yield cycloalkyl or cycloalkenyl alkyl-alkanoic acids in which the position of the alkyl substituent in the chain is known.

I claim:

1. The method which comprises heating a cycloalkanol and a cycloalkanone in approximately equimolar proportions under reflux at 160° to 190° C. in a reaction medium of an aqueous alkali metal hydroxide of at least 55 per cent concentration and having a boiling point of at least 160° C., until the condensation reaction, with liberation of water, is essentially complete, and separating the so-formed 2-(2-cycloalkenyl) cycloalkanol from the reaction mixture.

2. The method which comprises heating cyclohexanol and cyclohexanone in approximately equimolar proportions under reflux at 160° to 190° C. in a reaction medium of an aqueous alkali metal hydroxide of at least 55 per cent concentration and having a boiling point of at least 160° C., until the condensation reaction, with liberation of water, is essentially complete, and separating the so-formed 2-(2-cyclohexenyl) cyclohexanol from the reaction mixture.

3. The method which comprises heating cyclohexanol and cyclohexanone in approximately equimolar proportions under reflux at 160° to 190° C. in a reaction medium of potassium hydroxide of at least 55 per cent concentration, until the condensation reaction, with liberation of water, is essentially complete, and separating the so-formed 2-(2-cyclohexenyl) cyclohexanol from the reaction mixture.

EARL L. PELTON.

REFERENCES CITED

The following references are of record in the file of this patent:

UNITED STATES PATENTS

| Number | Name | Date |
| --- | --- | --- |
| 1,961,623 | Pelton | June 5, 1934 |
| 2,118,954 | Thomas | May 31, 1938 |
| 2,250,445 | Bruson et al. | July 29, 1941 |
| 2,425,343 | Pelton et al. | Aug. 12, 1947 |

FOREIGN PATENTS

| Number | Country | Date |
| --- | --- | --- |
| 397,883 | Great Britain | Sept. 1, 1933 |

OTHER REFERENCES

Bedos, Bull. Soc. Chim., vol. 39, pages 473 to 487 (1926).